United States Patent
Mizukami et al.

(10) Patent No.: US 6,804,071 B2
(45) Date of Patent: Oct. 12, 2004

(54) DIGITAL RECORDING APPARATUS NON-INFLUENCED BY RECORDING DATA RATE AND LOW FREQUENCY CUT-OFF, AND ENHANCING HIGH FREQUENCY COMPONENTS OF DATA BEING RECORDED

(75) Inventors: Mamoru Mizukami, Tokyo (JP); Kaoru Urata, Kanagawa (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 09/913,246

(22) PCT Filed: Dec. 14, 2000

(86) PCT No.: PCT/JP00/08861

§ 371 (c)(1),
(2), (4) Date: Feb. 11, 2002

(87) PCT Pub. No.: WO01/45093

PCT Pub. Date: Jun. 21, 2001

(65) Prior Publication Data

US 2003/0007267 A1 Jan. 9, 2003

(30) Foreign Application Priority Data

Dec. 14, 1999 (JP) .......................................... 11-354623

(51) Int. Cl.⁷ ............................. G11B 5/02; G11B 5/09
(52) U.S. Cl. ............................... 360/29; 360/51; 360/46
(58) Field of Search ............................. 360/26, 27, 29, 360/51, 45, 53, 64, 39, 40, 46, 68; 375/362, 371

(56) References Cited

U.S. PATENT DOCUMENTS 3,789,139 A  * 1/1974  Negishi ........................ 360/18
5,479,168 A  * 12/1995  Johnson et al. ............. 341/110

FOREIGN PATENT DOCUMENTS

| JP | 5-114107 | 5/1993 |
| JP | 7-6307 | 1/1995 |
| JP | 9-54905 | 2/1997 |

* cited by examiner

*Primary Examiner*—Alan T. Faber
(74) *Attorney, Agent, or Firm*—Frommer Lawrence & Haug LLP; William S. Frommer

(57) ABSTRACT

Digital data recording apparatus includes a modulator for modulating a recording clock by a recording data. A reference voltage and a reference current in signal processing are set based on a reference clock having a multiple cycle of the cycle of the recording clock when the reference clock is supplied via a rotary transformer. A demodulator demodulates a modulation signal supplied via the rotary transformer to produce a demodulation signal, from which a recording signal is generated for recording on a recording medium. The demodulator obtains a modulation signal and an inverted modulation signal from which first and second saw-tooth wave signals are produced when the reference current is supplied. A mixer mixes the first and second saw-tooth wave signals, and the demodulation signal is obtained, based on the mixer output and the reference voltage.

3 Claims, 5 Drawing Sheets

(1) RECORDING DATA FD
(2) RECORDING CLOCK FC
(3) MODULATION DATA FM1 OF (1) AND (2)

DIGITAL RECORDING APPARATUS NON-INFLUENCED BY RECORDING DATA RATE AND LOW FREQUENCY CUT-OFF, AND ENHANCING HIGH FREQUENCY COMPONENTS OF DATA BEING RECORDED

TECHNICAL FIELD

The present invention relates to a digital data recording apparatus, and in particular, to a digital data recording apparatus, which records a recording data on a magnetic tape using a rotary head.

BACKGROUND ART

In the case of handling digital information via a magnetic recording unit, there is a need of recording a binary information having logical values "1" and "0" on a magnetic medium without an error, and regenerating the binary information recorded from the magnetic medium without an error. In this case, a pulse string having binary information, that is, logical values "1" and "0" is converted into a recording data by an encoder, and a rectangular wave current corresponding to the recording data flows through a recording head. By doing so, a recording signal having a pulse string of logical values "1" and "0" is recorded in accordance with the presence or absence of magnetization reversal on the magnetic medium. Further, when regenerating, the presence of regenerative pulse signal at a predetermined time zone is detected based on a synchronizing signal, and then, the recording signal is regenerated by a decoder based on the detected pulse string.

In this case, a recording data is converted by the encoder when recording, and the minimum continuation length Tmin of the logical value "1" of the obtained recording data receives a limitation by a pulse interference generated in recording/regenerating process. For this reason, the minimum continuation length Tmin is hard to be set to a predetermined value or less. On the other hand, the maximum continuation length Tmax influences a synchronizing ability successively self-corrected by a regenerative detection pulse generated at the logical value "1" of the recording data, and a so-called low frequency cut-off is generated in signal transmission by a rotary transformer.

Moreover, in this type of digital data recording apparatus, in a high transfer rate, an edge portion of waveform pattern of recording current weakens by a permeability of the recording head and frequency characteristics of a recording amplifier; as a result, a high frequency component is deteriorated. For this reason, a phase of a short wavelength side is delayed with respect to a long wavelength side of a magnetizing pattern recorded on a magnetic tape, and therefore, a so-called peak shift occurs as well known.

In order to solve the problem of the low frequency cut-off by the rotary transformer of the above conventional digital data recording apparatus, the following system has been proposed. According to the system, the recording data is modulated at a recording clock, and then, is transmitted by a rotary transformer in a state of having no direct current component, and further, is demodulated using a delay line corresponding to a data rate. However, according to this method, in the case where the data rate is greatly variable, the configuration of the system becomes complicated, and it is impossible to perform a highly accurate demodulating operation.

Moreover, in order to suppress the peak shift to the lowest limitation, the following system has been proposed. According to the system, resonance of the recording head and an HPF are used, and thereby, a high frequency component of recording data is enhanced. However, according to this system, it is impossible to suitably adapt to variations of data rate.

DISCLOSURE OF THE INVENTION

The present invention has been made in view of the above problem of this type of digital recording apparatuses in the prior art. Therefore, an object of the present invention is to provide a digital data recording apparatus, which can transmit a recording data via a rotary transformer without receiving an influence of the recording data rate and low frequency cut-off, and can suitably enhance a high frequency component of the recording data in accordance with the recording data rate, and further, has a simple configuration.

A digital data recording apparatus of the present invention comprises:

modulation means for modulating a recording clock by a recording data;

reference level setting means for setting a reference voltage and a reference current in signal processing based on a reference clock having a multiple cycle of the cycle of the recording clock when the reference clock is supplied via a signal transmission line having low frequency cut-off characteristics;

demodulation means for obtaining a demodulation signal from a modulation signal when the modulation means supplies the modulation signal via the signal transmission line having low frequency cut-off characteristics;

recording signal generating means for generating a recording signal from the demodulation signal; and recording means for recording the recording signal on a recording medium, the demodulation means having: signal forming means for obtaining a modulation signal and an inverted modulation signal from the modulation signal; first and second saw-tooth wave generators for obtaining first and second saw-tooth wave signals from the modulation signal and the inverted modulation signal when a reference current is supplied from the reference level setting means; and a mixer for mixing the first and second saw-tooth wave signals, and obtaining the demodulation signal based on an output signal from the mixer and the reference voltage from the reference level setting means.

Further, the digital data recording apparatus of the present invention is provided with high frequency enhancement waveform generating means for generating a high frequency enhancement waveform with respect to the demodulation signal, and the high frequency enhancement waveform is superposed on the demodulation signal so as to generate a recording signal.

Further, the digital data recording apparatus of the present invention is provided with envelope detection means for detecting an envelope level of the modulation signal, and a recording current for recording the recording signal on a recording medium is controlled in accordance with the envelope level obtained from the envelope detection means.

According to the present invention, by a simple configuration, the modulation signal of the recording data is transmitted via a signal transmission line having low frequency cutoff characteristics such as a rotary transformer without being influenced by the recording data rate and low frequency cut-off, and the modulation signal after being transmitted via the signal transmission line having low frequency cut-off characteristics is demodulated. Further, a high frequency component of the demodulation signal is properly enhanced in accordance with the recording data rate, and peak shift is prevented with respect to a recording magnetizing pattern to thereby perform high-quality digital recording.

BEST MODE FOR CARRYING OUT THE INVENTION

An embodiment of the present invention will be described below with reference to FIG. 1 to FIG. 6.

Figure 1:
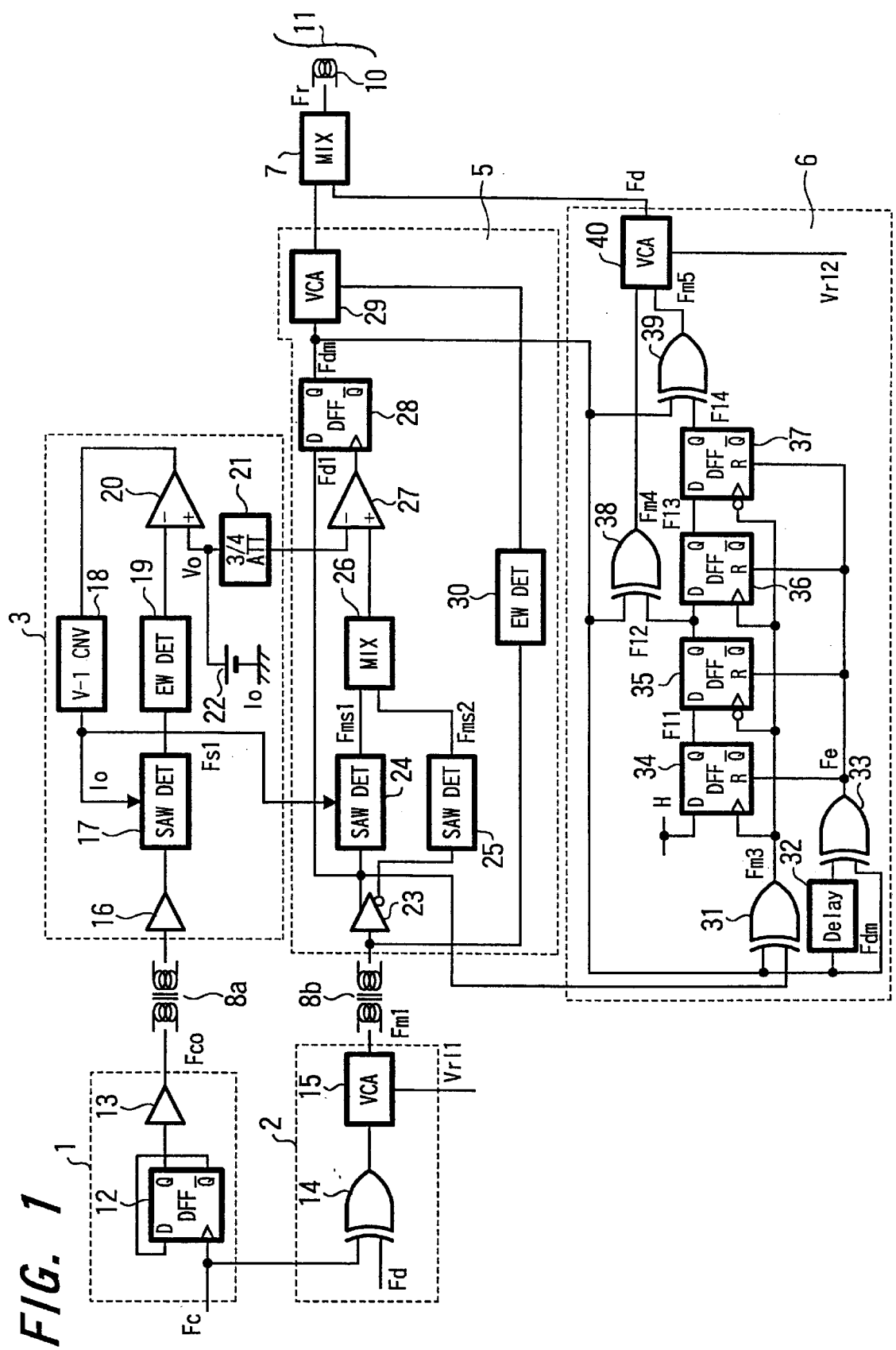
FIG. 1 is a circuit diagram showing a configuration of a digital data recording apparatus according to the embodiment of the present invention.
Figure 2:
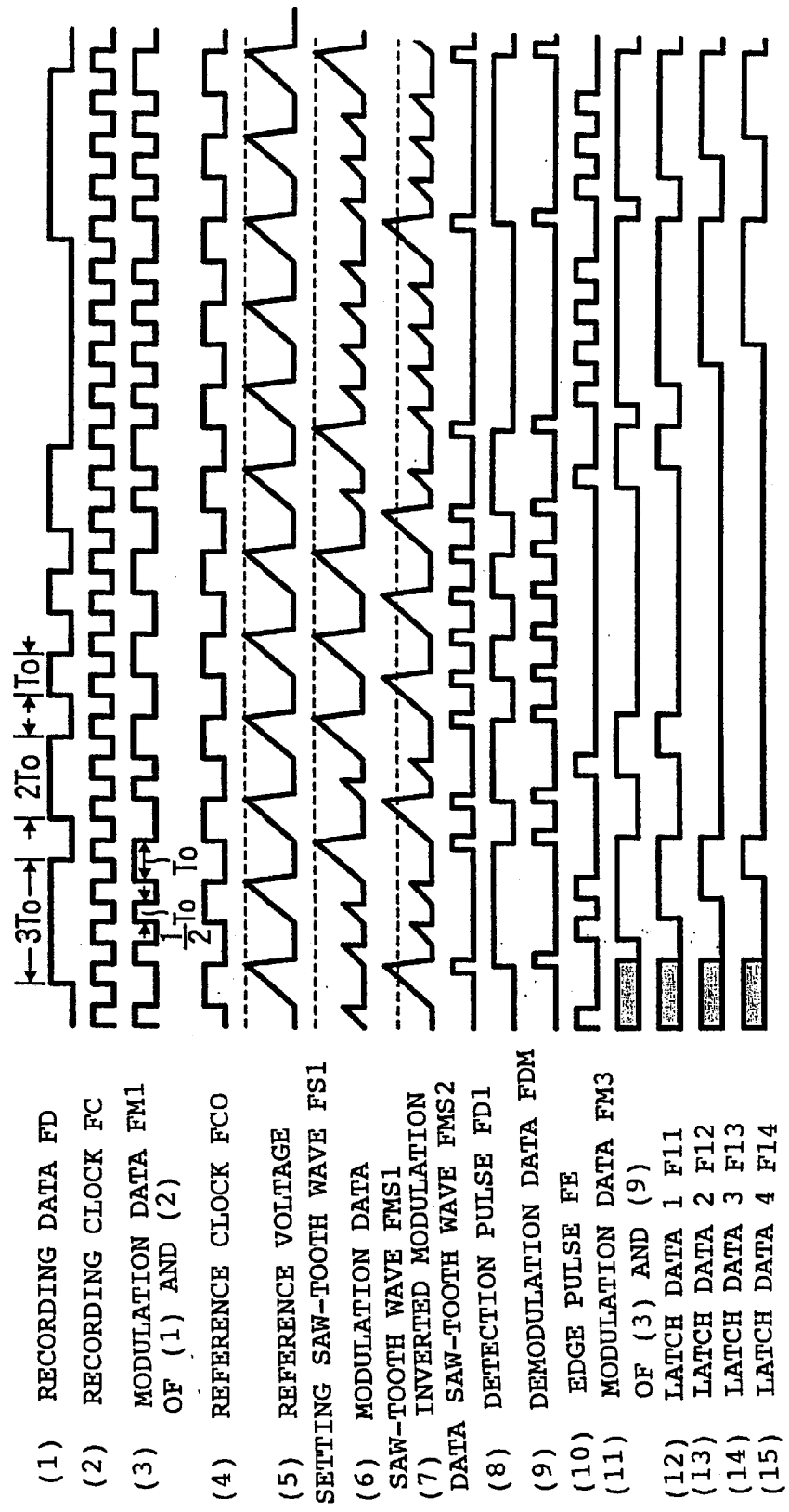
FIG. 2 is a timing chart showing signal waveforms of respective sections of FIG. 1.
Figure 3:
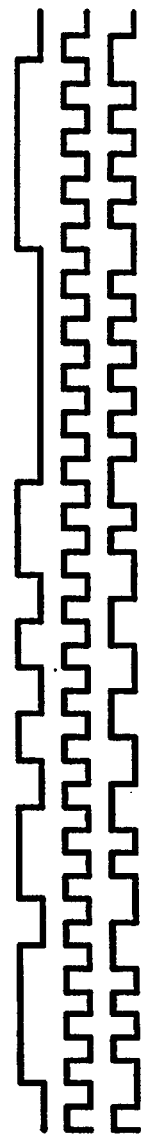
FIG. 3 is a timing chart showing a recording data modulating operation of FIG. 1.
Figure 4:
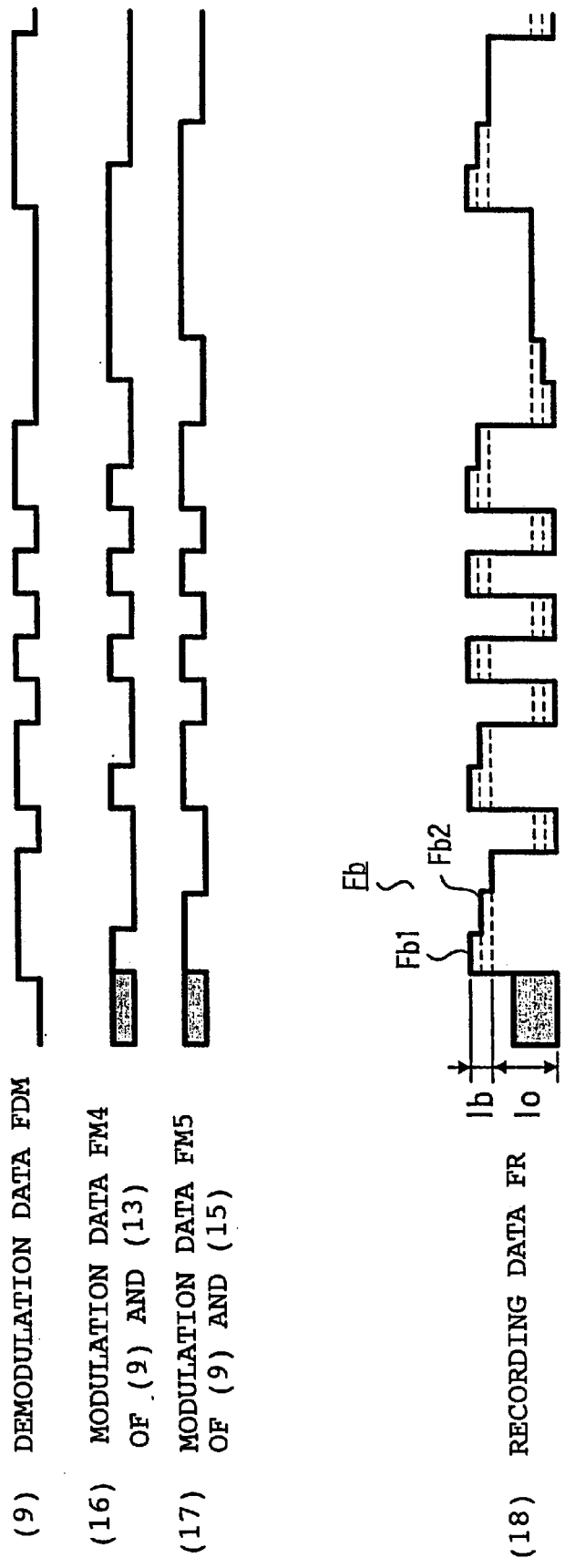
FIG. 4 is a timing chart showing a high frequency enhancement waveform generating operation of FIG. 1.
Figure 5:
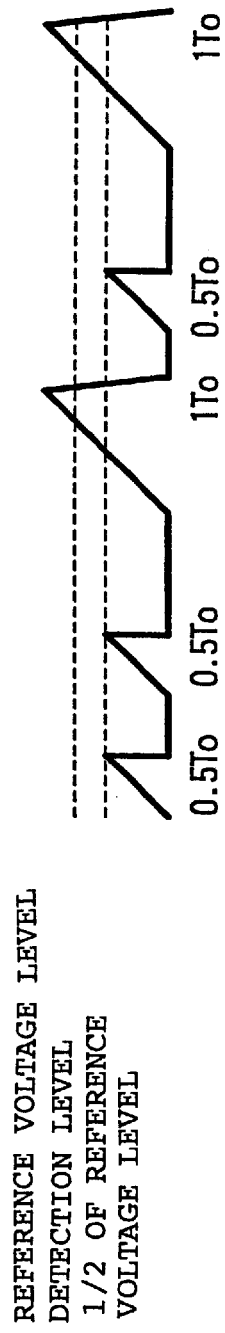
FIG. 5 is a diagram explaining reference voltage level setting of FIG. 1.
Figure 6:
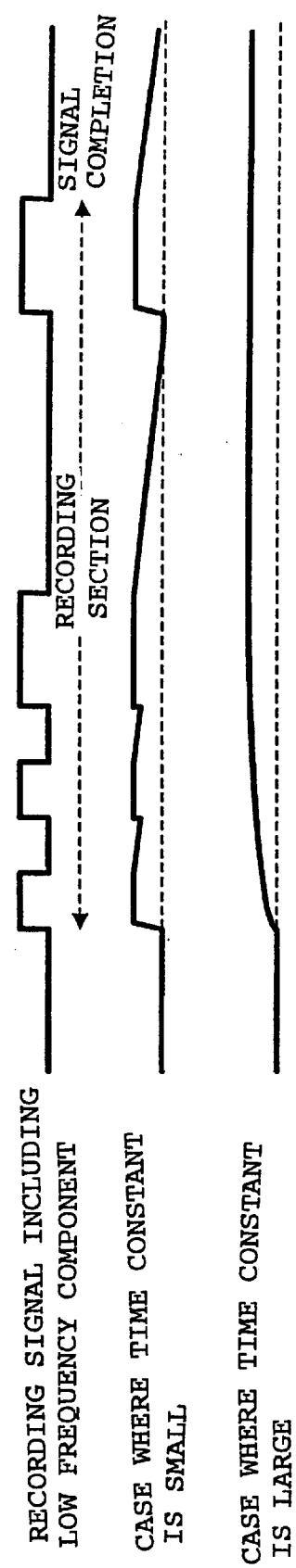
FIG. 6 is a diagram explaining detection of a recording signal including a low band component.

FIG. 1 is a circuit diagram showing a configuration of a digital data recording apparatus according to the embodiment of the present invention, FIG. 2 is a timing chart showing a signal waveform of each section of the digital recording apparatus according to the embodiment, FIG. 3 is a timing chart showing a recording data modulating operation of the embodiment, FIG. 4 is a timing chart showing a high frequency enhancement waveform generating operation of the embodiment, FIG. 5 is a diagram explaining reference voltage level setting of the embodiment, and FIG. 6 is a diagram explaining detection of a recording signal including a low band component.

According to this embodiment, as shown in FIG. 1, the digital data recording apparatus is provided with a modulation signal output circuit 2 and a reference clock output circuit 1. More specifically, the modulation signal output circuit 2 modulates a recording clock Fc by a recording data Fd so as to output a modulation data Fm1. The reference clock output circuit 1 generates a reference clock Fco from the recording clock Fc, and outputs it. Further, the reference clock output circuit 1 is connected with a reference signal setting circuit 3 for setting a reference signal based on the reference clock Fco via a rotary transformer 8a. The modulation signal output circuit 2 is connected with a demodulation signal output circuit 5 for demodulating and outputting the modulation signal Fm1 via a rotary transformer 8b. The demodulation signal output circuit 5 is connected with the reference signal setting circuit 3.

In addition, the demodulation signal output circuit 5 is connected with a high frequency enhancement waveform generating circuit 6 for generating a high frequency enhancement waveform. An output terminal of the demodulation signal output circuit 5 is connected to one input terminal of a mixer 7, and an output terminal of the high frequency enhancement waveform generating circuit 6 is connected to the other input terminal of the mixer 7. A recording data Fr is outputted from the mixer 7, and then, is inputted to a recording head 10, which is so arranged as to closely face a recording medium 11.

According to this embodiment, in the modulation signal output circuit 2, an exclusive OR circuit 14 performs an operation of an exclusive logical sum of the recording data Fd and the recording clock Fc. An output signal of the exclusive OR circuit 14 is set to a predetermined voltage level by a voltage control amplifier 15 connected to the output terminal of the exclusive OR circuit 14. The voltage control amplifier 15 outputs a modulation data Fm1 as shown in FIG. 2(3).

The continuation length of logical value "1" of the modulation data Fm1 is a minimum continuation length To of the logical value "1" of the recording data Fd, and ½ continuation length of the To, that is, (½) To. Therefore, the continuation length is sufficiently small as compared with a continuation length 3 To of the logical value "1" of the recording data Fd. The modulation data Fm1 is transmitted to the demodulation signal output circuit 5 by the rotary transformer 8b without generating a low frequency cut-off.

On the other hand, in the reference clock output circuit 1, a cycle of the recording clock Fc is doubled by a flip-flop 12, and thereafter, is amplified by an amplifier 13 connected to the flip-flop 12. A reference clock Fco as shown in FIG. 2(4) is outputted from the amplifier 13, and then, is inputted to the reference signal setting circuit 3 via the rotary transformer 8a.

In the reference signal setting circuit 3, the reference clock Fco is amplified by an amplifier 16, and thereafter, is inputted to a saw-tooth wave generator 17 connected to the amplifier 16. The saw-tooth wave generator 17 outputs a saw-tooth wave signal Fs1 for setting a reference voltage level, and then, the saw-tooth wave signal FS1 is inputted to an envelope detector 19 connected to the saw-tooth wave generator 17.

The envelope detector 19 is connected with a differential amplifier 20, and a reference voltage Vo is applied to a non-inverting input terminal of the differential amplifier 20 from a battery 22.

Thus, when a voltage value of the peak of the saw-tooth wave signal Fs1 detected by the envelope detector 19 reaches a reference voltage Vo, the logical value of output signal of the differential amplifier 20 becomes "1", and then, a reference current Io is outputted from a voltage-current converter 18 connected to the differential amplifier 20. The reference current Io is inputted to the saw-tooth wave generator 17, and the reference signal setting circuit 3 is servo-controlled in a state of setting the reference voltage Vo and the reference current Io.

By the way, the modulation data Fm1 inputted to the demodulation signal output circuit 5 is inputted to an amplifier 23, and then, the amplifier 23 outputs the modulation data-Fm1 and an inverted modulation data [−Fm1]. The modulation data Fm1 is inputted to a saw-tooth wave generator 24 connected to the amplifier 23; on the other hand, the inverted modulation data [−Fm1] is inputted to a saw-tooth wave generator 25 connected to the amplifier 23.

When the reference current Io is supplied from the reference signal setting circuit 3 to the saw-tooth wave generator 24, the saw-tooth wave generator 24 outputs a saw-tooth wave signal Fms1 as shown in FIG. 2(6), and likewise, the saw-tooth wave generator 25 outputs a saw-tooth wave signal Fms2 as shown in FIG. 2(7).

These saw-tooth wave generators 24 and 25 are connected with one input terminal and the other input terminal of a mixer 26, respectively, and the saw-tooth wave signals Fms1 and Fms2 are mixed by the mixer 26. The mixed signal is inputted to a non-inverting input terminal of a differential amplifier 27 connected to the mixer 26. On the other hand, a ¾-voltage value (¾) Vo of the reference voltage Vo is applied to an inverted input terminal of the differential amplifier 27 from an attenuator 21 connected to the non-inverting input terminal of the differential amplifier 20 of the reference signal setting circuit 3.

Thus, when the voltage value of the mixed signal outputted from the mixer 26 exceeds (¾) Vo, the differential amplifier 27 outputs a detection pulse Fd1 as shown in FIG. 2(8). The detection pulse Fd1 is inputted to a clock terminal of a flip-flop 28 connected to the differential amplifier 27, and the flip-flop 28 outputs a demodulation data Fdm as shown in FIG. 2(9). Then, the demodulation data Fdm is set to a predetermined signal level by a voltage control amplifier 29 connected to the flip-flop 28. In this case, the voltage control amplifier 29 controls an amplification degree in accordance with an envelope level of the modulation data Fm1 detected by an envelope detector 30.

On the other hand, in the high frequency enhancement waveform generating circuit 6, the exclusive OR circuit 31 carries out an operation of the exclusive logical sum of the modulation data Fm1 from the amplifier 23 of the demodulation signal output circuit 5 and the demodulation data Fdm from the flip-flop 28. By doing so, a modulation signal Fm3 as shown in FIG. 2(11) is obtained. Further, the exclusive OR circuit 33 carries out an operation of the exclusive logical sum of a signal such that the demodulation data Fdm from the flip-flop 28 is delayed by a delay circuit 32 and the demodulation data Fdm, and thereby, an edge pulse Fe as shown in FIG. 2(10) is obtained.

Moreover, in the high frequency enhancement waveform generating circuit 6, a latter stage of the exclusive OR circuit 31 is provided with a latch circuit having flip-flops 34 to 37 connected in series. An output terminal of the exclusive OR circuit 31 is connected to each clock terminal of the flip-flops 34 to 37; on the other hand, an output terminal of the exclusive OR circuit 33 is connected to each reset terminal of the flip-flops 34 to 37.

The latch circuit carries out a latch operation according to the modulation signal Fm3 while resetting by the edge pulse Fe, and the flip-flops 34 to 37 output latch data F11 to F14 as shown in FIG. 2(12) to FIG. 2(15), respectively.

Further, the high frequency enhancement waveform generating circuit 6 is provided with exclusive OR circuits 38 and 39, which individually have one input terminal connected to the output terminal of the flip-flop 28 of the demodulation signal setting circuit 5 and the other input terminal connected to each output terminal of the flip-flops 35 and 37.

The exclusive OR circuit 38 carries out an operation of the exclusive logical sum of the demodulation data Fdm shown in FIG. 2(9) and the latch data F12 shown in FIG. 2(13) to thereby obtain a modulation data Fm4 as shown in FIG. 4(16). The modulation data Fm4 is inputted to one input terminal of a voltage control amplifier 40 connected to the exclusive OR circuit 38.

Moreover, the exclusive OR circuit 39 carries out an operation of the exclusive logical sum of the demodulation data Fdm shown in FIG. 2(9) and the latch data F14 shown in FIG. 2(15) to thereby obtain a modulation data Fm5 as shown in FIG. 4(17). The modulation data Fm5 is inputted to the other input terminal of the voltage control amplifier 40 connected to the exclusive OR circuit 39.

According to this embodiment, in the voltage control amplifier 40, a summing operation is carried out with respect the inputted modulation data Fm4 and modulation data Fm5, and then, a high frequency enhancement waveform Fb having a width corresponding to a data rate is generated. On the other hand, the signal level of the demodulation data Fdm outputted from the flip-flop 28 is adjusted and controlled by the voltage control amplifier 29. The demodulation data Fdm having the controlled signal level is inputted to one input terminal of the mixer 7, and the high frequency enhancement waveform Fb from the voltage control amplifier 40 is inputted to the other input terminal of the mixer 7.

Thus, a recording data Fr as shown in FIG. 4(18) is generated by the demodulation data Fdm having a signal level controlled by the mixer 7 and the high frequency enhancement waveform Fb. A suitable high frequency enhancement waveform Fb corresponding to the recording condition is added to the recording data Fr. Therefore, the high-quality recording data Fr outputted from the mixer 7 is recorded on the recording medium 11 by the recording head 10.

In this case, with respect to the recording data Fr, a reference current level Io of the recording data Fr shown in FIG. 4 and a current level Ib of the high frequency enhancement waveform Fb are set to the optimum value corresponding to the recording condition by the voltage control amplifiers 29 and 40, respectively. Therefore, it is possible to perform high-quality digital recording in which high frequency enhancement is suitably made in accordance with recording conditions.

In general, in the case of detecting an amplitude of recording data, as shown in FIG. 6, in order to stably record a recording data including a range from a high frequency component to a low frequency component close to direct current component, a time constant of detection must be made large. However, if the time constant of detection is made large, it is difficult to follow recording start and recording completion.

According to this embodiment, as shown in FIG. 2(3), the continuation length of the signal logical value "1" of the modulation data Fm1 is only the minimum continuation length To and ½ continuation length (½) To of the signal logical value "1" of the recording data Fd. Further, the time constant of detection is set to a smaller value convenient for the follow-up to the continuation length To, so that it is possible to most suitably follow recording start and recording completion.

As described above, according to this embodiment, the modulation signal output circuit 2 modulates the recording clock Fc by the recording data Fd, and the reference signal setting circuit 3 sets a reference signal level based on the reference clock Fco having a cycle twice as much as the cycle of the recording clock Fc. Further, the demodulation signal output circuit 5 demodulates the modulation signal Fm1 based on the saw-tooth wave signal Fms1 corresponding to the modulation signal Fm1 obtained by the modulation signal output circuit 2 and the inverted saw-tooth wave signal Fms2 corresponding to an inverted signal of the modulation signal to thereby obtain a demodulation data Fdm. The high frequency enhancement waveform generating circuit 6 generates a high frequency enhancement waveform Fb corresponding to the demodulation data Fdm, and the mixer 7 superposes the high frequency enhancement waveform Fb on the demodulation data Fdm, so that a recording signal Fr is obtained.

Therefore, according to this embodiment, with a simple configuration using no special circuit element, it is possible to transmit the modulation data Fm1 of the recording data Fd via the rotary transformer 8*b* without receiving an influence of recording data rate and low frequency cut-off, and to demodulate the data after transmission. Further, a high frequency component of the demodulation data Fdm is securely enhanced in accordance with the recording data rate, and peak shift is prevented with respect to a recording magnetizing pattern, so that it is possible to perform high-quality digital recording.

The above embodiment has described the case of forming two high frequency enhancement waveforms, that is, the high frequency enhancement waveform Fb1 and the high frequency enhancement waveform Fb2 as shown in FIG. 4(18). The present invention is not limited to the above embodiment, and the number of high frequency enhancement waveforms may be increased and decreased. Moreover, the current level does not have to be controlled in common as the above embodiment, and may be controlled independently.

Further, the above embodiment has described the case where a clock having a cycle twice as much as the cycle of the recording clock is used as the reference clock when demodulating the recording data whose recording clock is modulated, and the detection level of the saw-tooth wave is set to (¾) Vo. The cycle and detection level having other multiplied values may be used In this case, if the reference clock is set to n=1, the detection level is 0.75 n. Thus, in the case where the recording clock is used, the reference clock becomes n=2; so that a voltage of 1.5 times as much as the reference voltage Vo may be used as the detection level. Further, as to the coefficient 0.75, an arbitrary value from 0.5 to 1.0 may be used when accurate judgment is possible.

According to the present invention, the modulation means modulates the recording clock by the recording data, and the reference signal setting means sets a reference signal level in signal processing based on the reference clock having a multiple cycle of the cycle of the recording clock. Further, the demodulation means demodulates the modulation signal based on the saw-tooth wave signal corresponding to the modulation signal obtained by the modulation means and the inverted saw-tooth wave signal corresponding to an inverted signal of the modulation signal to thereby obtain a demodulation signal. The high frequency enhancement waveform generating means generates a high frequency enhancement waveform corresponding to the demodulation signal, and the recording signal generating means superposes the high frequency enhancement waveform on the demodulation signal to generate the recording signal. Therefore, in spite of a simple configuration, it is possible to transmit the modulation signal of the recording data via the rotary transformer without receiving an influence of the recording data rate and low frequency cut-off. Further, a high frequency component of the demodulation signal generated by demodulating the modulation signal after transmission via the rotary transformer is securely enhanced in accordance with the recording data rate, and peak shift is prevented with respect to a recording magnetizing pattern, so that it is possible to perform high-quality digital recording.

What is claimed is:

1. A digital data recording apparatus, characterized by including:

modulation means for modulating a recording clock by a recording data;

reference level setting means for setting a reference voltage and a reference current in signal processing based on a reference clock having a multiple cycle of the cycle of the recording clock when the reference clock is supplied via a signal transmission line having low frequency cut-off characteristics;

demodulation means for obtaining a demodulation signal from a modulation signal when the modulation means supplies the modulation signal via the signal transmission line having low frequency cut-off characteristics;

recording signal generating means for generating a recording signal from the demodulation signal; and recording means for recording the recording signal on a recording medium, the demodulation means having: signal forming means for obtaining a modulation signal and an inverted modulation signal from the modulation signal; first and second saw-tooth wave generators for obtaining first and second saw-tooth wave signals from the modulation signal and the inverted modulation signal when the reference current is supplied from the reference level setting means; and a mixer for mixing the first and second saw-tooth wave signals, and obtaining the demodulation signal based on an output signal from the mixer and the reference current from the reference level setting means.

2. The digital data recording apparatus according to claim 1, characterized by further including a high frequency enhancement waveform generating means for generating a high frequency enhancement waveform with respect to the demodulation signal, the high frequency enhancement waveform being superposed on the demodulation signal so as to generate a recording signal.

3. The digital data recording apparatus according to claim 1, characterized by further including envelope detection means for detecting an envelope level of the modulation signal, a recording current for recording the recording signal on a recording medium being controlled in accordance with an envelope level obtained from the envelope detection means.

* * * * *